S. HOFMANN.
WATER FAUCET WASHER.
APPLICATION FILED OCT. 2, 1919.
1,366,803.
Patented Jan. 25, 1921.
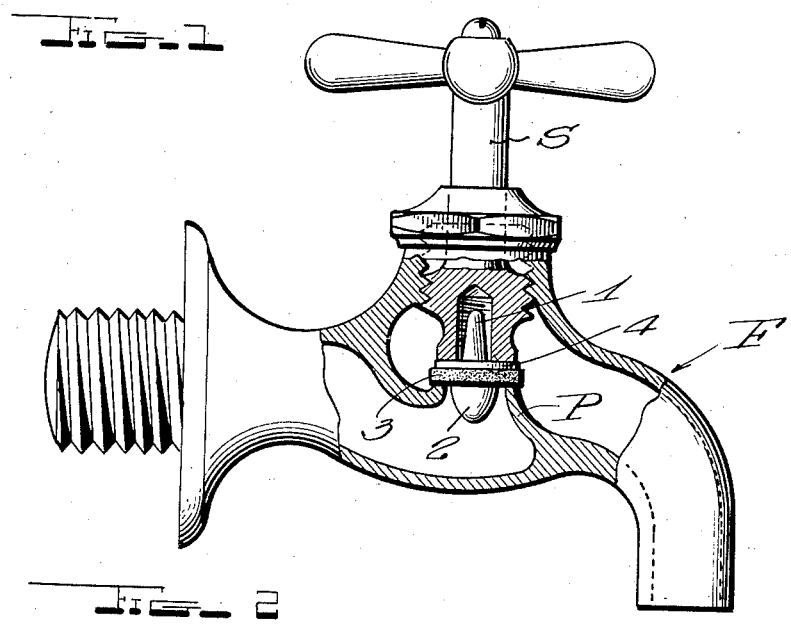
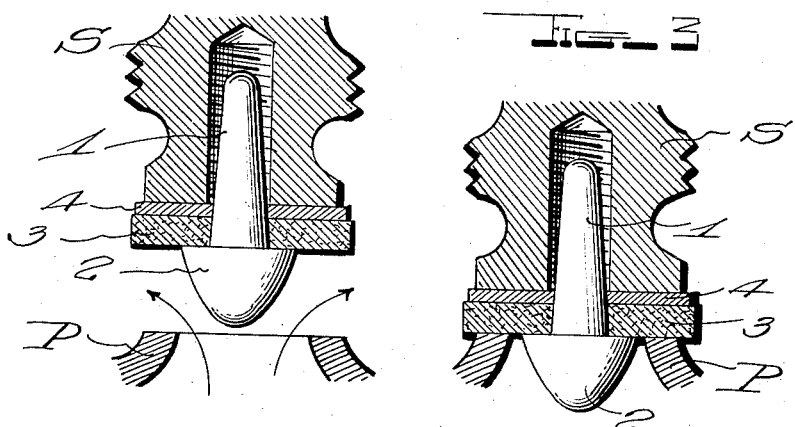
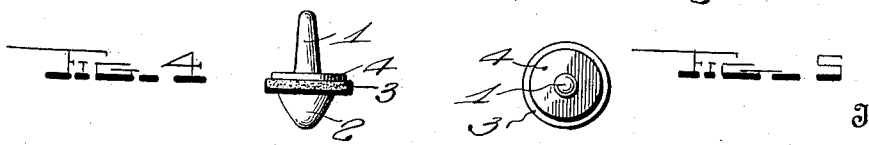
Witness
Inventor
S. Hofmann
By H. B. Willson & Co.
Attorneys

UNITED STATES PATENT OFFICE.

STEPHEN HOFMANN, OF BROOKLYN, NEW YORK.

WATER-FAUCET WASHER.

1,366,803.

Specification of Letters Patent.   Patented Jan. 25, 1921.

Application filed October 2, 1919.   Serial No. 327,848.

*To all whom it may concern:*

Be it known that I, STEPHEN HOFMANN, a citizen of the United States, residing at Brooklyn, in the county of Kings and State of New York, have invented certain new and useful Improvements in Water-Faucet Washers; and I do declare the following to be a full, clear, and exact description of the invention, such as will enable others skilled in the art to which it appertains to make and use the same.

This invention relates to improvements in valves for faucets and the like.

The principal object is to provide a valve adapted for use in place of the ordinary valve to eliminate the grinding and cutting action which the seat has on the washer commonly used and in which the washer is rotated with the valve operating stem and to provide the valve with a double guide for retaining it in its proper position.

Another object is to provide a simple and inexpensive valve which is formed of permanently connected parts, one of which may be readily substituted for the ordinary valve by persons not experienced in plumbing.

With the above and other objects in view, the invention consists of certain novel features of construction and the combination and arrangement of parts as will be more fully described and claimed.

I attain these objects by constructing the valve as illustrated in the accompanying drawings; in which—

Figure 1 is a side elevation of a faucet with parts in section showing the valve seated;

Fig. 2 is a detail vertical section of the valve in its raised or open position;

Fig. 3 is a view similar to Fig. 2, but showing the valve seated;

Fig. 4 is a side elevation of the valve; and,

Fig. 5 is a top plan view thereof.

In the drawings a faucet F is shown provided with the usual valve operating stem S, the lower end of which is provided with the usual threaded recess or socket in which the ordinary valve is usually secured. The faucet is formed with a partition P in which an opening is provided, the wall of the opening serving as a valve seat. The above description is that of an ordinary faucet and it is understood that my improved valve is not limited to use on any particular style or pattern of faucet.

The valve comprises a central stem 1 which rises vertically from the center of the flat upper face of an elongated head 2, said head being preferably slightly tapered downwardly to assist in centering the valve in its seat. The head 2 and the stem 1 are preferably formed integrally from a suitable metal.

Preferably though not necessarily the upper face of the head is shaped to form an annular shoulder around the base of the stem 1 to provide a support for a washer 3, said washer being formed of rubber, leather, fiber or any other suitable material and provided with a central aperture through which the stem is passed.

For the purpose of retaining the washer in position, I provide a flat disk 4 preferably formed of metal and provided with a central opening to receive the stem 1 of the valve. The stem is preferably tapered upwardly from its base and when the parts are assembled, the flat disk 4 is forced upon the stem, engages it frictionally and clamps the washer tightly against the flat face of said head.

When a valve of this construction is to be substituted for a worn out valve, the valve operating stem is removed and the new valve placed upon the seat with its head 2 extending downwardly through the valve opening and serving as a guide for the valve when it is seating itself. There is no adapting or fitting to the seat necessary in this valve, as the device is ready to be dropped to its seat and to operate without further attention. Also, due to the fact that the parts of the valve are permanently secured together, a unitary article will be had. Consequently, the parts will never get lost.

The water pressure will raise the valve when the operating stem is raised and when the stem is again screwed down the thrust of said stem will be received on the flat disk 4 thereby eliminating grinding and cutting the washer.

This particular form of valve is absolutely certain to properly seat itself at all times, due to the double guide formed by the head 2 which extends into the valve opening, and the stem 1 which projects and is loosely received in the recess or socket in the lower end of the operating stem.

It is well known that in the ordinary type of valve, the screws work loose or break off after a short period of use and the disks are released and then the faucet is useless until repaired. Furthermore, as hereinbefore stated, rotation of the valve washer with the operating stem quickly grinds and cuts away the washers and with a valve of the construction hereinbefore set forth these faults and others are eliminated.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

I claim:

As an article of manufacture, a valve for faucets comprising an elongated tapered head to project downwardly through a valve opening to guide the valve to its seat, said head having a flat upper face, an integral centrally disposed upwardly tapered stem rising from the flat face of said head, being adapted for reception in a socket in the lower end of a valve operating stem, a gasket forced onto the stem and bearing on the flat face of the head, a metal washer also forced onto and frictionally engaging the tapered stem, serving to clamp the gasket tightly against the head, whereby a unitary article is provided.

In testimony whereof I have hereunto set my hand.

STEPHEN HOFMANN.